Figure 1:
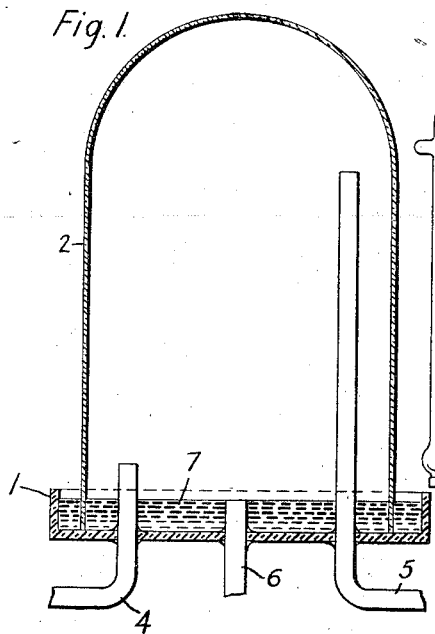

W. O. SNELLING.
PHOTOCHEMICAL APPARATUS.
APPLICATION FILED MAR. 6, 1917.

1,382,252.

Patented June 21, 1921.

WITNESSES:
Fred H. Miller
M. M. Henkel

INVENTOR
Walter O. Snelling
BY
Robson De S. Brown
ATTORNEY of the actinic energy which would otherwise be absorbed by the freshly incoming reactants which are caused to enter the reaction chamber at such point of juncture.

UNITED STATES PATENT OFFICE.

WALTER O. SNELLING, OF ALLENTOWN, PENNSYLVANIA.

PHOTOCHEMICAL APPARATUS.

1,382,252.                Specification of Letters Patent.    Patented June 21, 1921.

Application filed March 6, 1917. Serial No. 152,588.

*To all whom it may concern:*

Be it known that I, WALTER O. SNELLING, a citizen of the United States, and a resident of Allentown, in the county of Lehigh and State of Pennsylvania, have invented a new and useful Improvement in Photochemical Apparatus, of which the following is a specification.

My invention relates to photochemical reactions involving the exposure of mixtures of liquid, vaporous or gaseous reagents to actinic rays for the purpose of inducing or facilitating their interaction, and one of my objects is to provide a simple and commercially practicable process of producing photochemical reaction products at a rapid rate and with a minimum experditure of actinic energy. One specific application of this process is in the production of halogenated carbon compounds such as carbon tetrachlorid, chloroform, methylene chlorid and other compounds which are produced by mixing gaseous or vaporous hydrocarbons with chlorin gas, bromin or iodin vapors and exposing the mixtures to actinic light.

Another object of my invention is to provide apparatus of inexpensive and convenient construction for carrying out my above indicated process.

Figure 2:
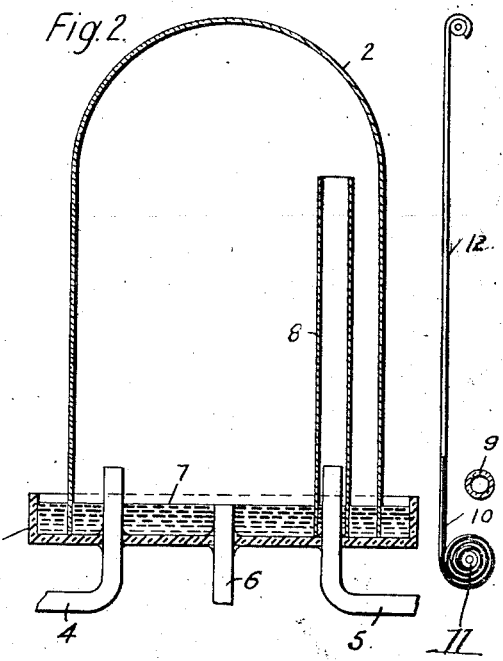
Figure 3:
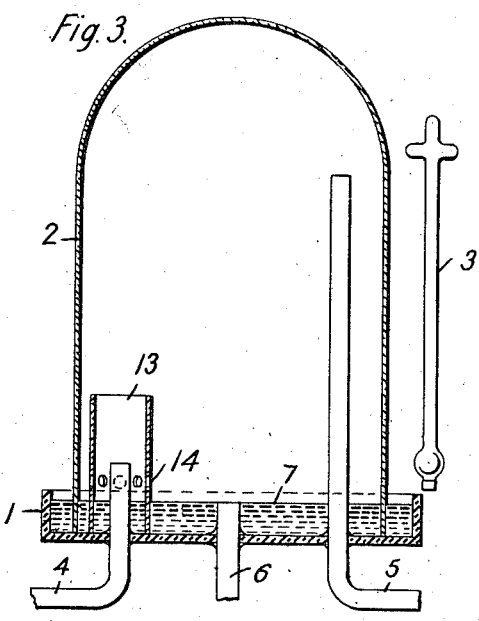
Figure 4:
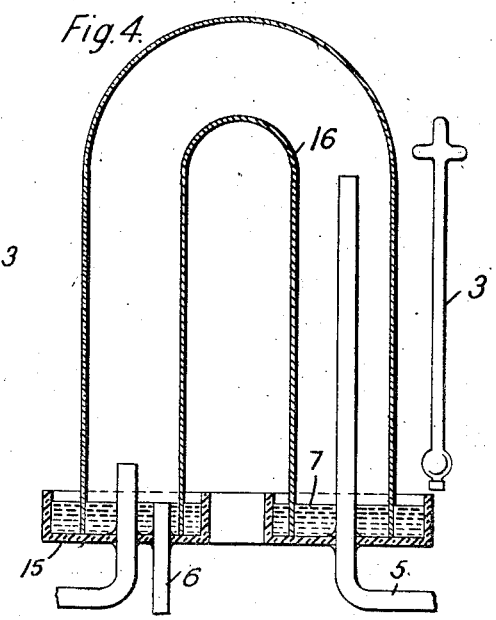

The reactions to which my invention relates tend to proceed with explosive violence and are therefore of little technical value unless means are provided for materially reducing the reaction velocity. In my copending applications for Letters Patent, Serial No. 776,834, filed July 1, 1913, Serial No. 848,355, filed July 1, 1914, and Serial No. 132,869, filed November 22, 1916, I have described and claimed a method of decelerating photochemical reactions by causing mixtures of reactive gases or liquids to approach a source of actinic light by a path which is so related to the light source that the light which reaches the entering reactive mixture has passed through a considerable mass of partially combined reagents which serve to screen or filter out the actinic rays in proportion to the thickness of the mass of reacting gases. The light is thus progressively consumed and deprived of its energy, while the reactive mixture, moving in countercurrent relation to the light rays, meets with light of greater and greater intensity as it advances and as the tendency toward high reaction velocity decreases by reason of the progressive completion of the reaction. My present invention is concerned with certain developments of this general "countercurrent" principle of photochemical treatment, and is illustrated in the accompanying drawing, in which:

Figure 1 is a central vertical sectional view of a reaction cell constructed in accordance with my invention. Fig. 2 is a similar view showing a modified form of cell provided with means for varying the distribution of light within the reaction chamber. Fig. 3 is a similar view of another modified form of device, provided with means for diluting the incoming reaction mixture with partial or complete reaction products before being exposed to the light, and Fig. 4 is a similar view of a further modification of my device in which an opaque inner dome is provided for cooling the reacting gases and for regulating the distribution of light.

In my earlier applications which I have mentioned above, I have described my "countercurrent" principle of photochemical treatment with specific reference to the use of a series of reaction chambers so constructed and connected that the mixture of reactive gases or vapors is caused to cross and recross the path of the light rays a considerable number of times. My present process is a modification of these processes and is characterized by the use of a single reaction vessel only and by certain methods and means wherein I make use of the "countercurrent" principle without the use of a plurality of interconnected reaction vessels.

In all of the several forms of apparatus which are shown herein, a mixture of photochemically reactive fluids is caused to enter a transparent reaction dome at a point remote from a source of light which is preferably disposed outside of and adjacent to the dome. An outlet for gaseous or vaporous reaction products is provided at the side of the dome nearest to the light source, the result of this arrangement being that the reaction mixture, at its entrance into the dome, is separated from the light source by a thick mass of gases and vapors which have partially or entirely reacted with each other. This interposed blanket of reacting gases and vapors serves to consume a large part of the chemically active rays from the light source, and therefore the gas mixture, when it first enters the reaction chamber, is exposed only to relatively feeble rays which are not sufficiently active to bring about a degree of reaction which will raise the temperature of the entering gases to the ignition point. As the gas mixture advances toward the outlet of the dome, it is met with light of progressively increasing strength, in accordance with the countercurrent principle which is outlined above and is described and claimed in my earlier applications.

According to a further development of my invention, which is incorporated in certain of the forms of devices illustrated herein, I provide means for permitting the mixture of gases or vapors which enters the reaction chamber to partially diffuse, before being exposed to the rays from the light source, with the more or less completely combined gases or vapors which are already in the chamber. Several methods for permitting such initial diffusion of the entering gases are illustrated in Figs. 2, 3 and 4 of the drawing and will be more fully described below.

Referring now to the figures of the drawing, the apparatus shown in Fig. 1 consists of a shallow pan or tray 1 upon which rests a transparent dome 2 and adjacent to which is disposed a source of actinic light represented by a mercury vapor lamp 3. The pan 1 may suitably be composed of lead, stoneware or some other material which is not attacked by the reagents present, and is provided with a gas inlet pipe 4, a gas outlet pipe 5 and a fluid outlet pipe 6, all of these pipes extending through the bottom of the pan and being sealed therein. The inlet pipe 4 and the outlet pipe 5 both extend into the interior of the dome 2 through a liquid seal 7 which serves to exclude the outside air from the interior of the dome and which may suitably consist of liquid reaction products formed within the dome. As shown, the outlet pipe 5 is materially longer than the inlet pipe 4 and may extend nearly to the top of the dome 2.

It will be observed that the light source 3 is disposed at the side of the dome nearest to the outlet pipe 5 and farthest from the inlet pipe 4. By reason of this arrangement, the mixture of reactive gases or vapors introduced into the dome 2 through the pipe 4 moves toward the light source 3 in its passage to the outlet pipe 5, with the result that each portion of the gas mixture is first subjected to light which is dim at first on account of the absorptive effect of the gas blanket between the inlet and outlet pipes and which gradually increases as the gases approach the outlet. The gases composing the reaction mixture therefore react progressively and quietly. If desired, jets of air or water may be directed downwardly upon the dome 2 in order to control the temperature of the reacting gases and insure that the gases shall not be heated to the ignition point.

The form of device shown in Fig. 2 is similar in many respects to that shown in Fig. 1, and the corresponding parts are similarly designated. In this device, however, the outlet pipe 5 is of about the same length as the inlet pipe 4 and is surrounded by a tube 8 of somewhat larger diameter than the pipe 5, which is set over the end of the pipe 5 in telescoped relation thereto and produces the same effect as the longer pipe 5 shown in Fig. 1.

The light source shown in Fig. 2 consists of a mercury vapor lamp 9 or other elongated luminous body which is disposed horizotally near the edge of the pan 1. An adjustable screen 10 is adapted to be interposed between the lamp and the dome and may consist of a sheet of fabric mounted upon a roller 11 and operated after the manner of an ordinary window shade by means of cords, one of which is shown at 12. The purpose of the screen 10 is to prevent the direct rays from the lamp 9 from falling upon the inlet opening of the pipe 4. This arrangement permits the gases from the inlet to diffuse somewhat with the contents of the dome 2 before undergoing too vigorous action as they rise and are subjected to the rays which have penetrated through the reaction mixture between the inlet and the outlet. By vertically adjusting the screen 10, the incoming gases may be caused to diffuse to a greater or less degree.

Fig. 3 shows a structure which is essentially similar to that shown in Fig. 1, with the addition of a sleeve or chimney 13 of glass, porcelain or the like, which surrounds the inlet pipe 4. The sleeve 13 is provided with a series of draft openings 14 somewhat below the upper end of the pipe 4. The gases entering the dome through the pipe 4 aspirate a portion of the gaseous contents of the dome through the openings 14 and mix with such gases in the upper part of the sleeve 13 before being subjected to the direct rays from the lamp 3.

Fig. 4 shows an arrangement which comprises an annular pan 15 upon which is supported an inner dome 16, preferably of metal, and an outer dome 2, of glass or other transparent material, the remaining features of this form of device being similar to those shown in Fig. 1. The metal dome 16 serves to permit diffusion of the incoming gas mixture with the partially combined gaseous matter between dome 2 and dome 16 before being subjected to the direct rays of light from the lamp 3. In this form of device, the temperature between dome 2 and dome 16 may be effectively controlled by blowing hot or cold air into the interior of the inner dome 16.

The apparatus which I have shown and described is of particular advantage in preparing chlorinated hydrocarbons from mixtures of chlorin and natural gas. Using a glass dome about 18 inches in diameter and exposed to the full rays of the sun, I am able to deliver mixed chlorin and natural gas to the dome at a rate in excess of 1 cubic foot per minute with complete and quiet reaction to produce large quantities of chloroform and other chlorin compounds. The dimensions of the domes to be used in carrying out my invention should be selected in accordance with the actinic strength of the light to be employed, a diameter of 6 inches being the practical minimum diameter which I have found to be successful. Better results are obtained with domes from 1 foot to 18 inches in diameter.

The structures which I have shown and described may be associated with one another and with other apparatus in various ways and may be modified in many particulars as will be apparent to those skilled in the construction and operation of chemical apparatus. It is to be understood that the structural details herein shown are intended to be illustrative only and not as imposing restrictions upon my invention, which is to be limited only by the scope of the appended claims.

I claim as my invention:

1. Photochemical apparatus comprising a shallow pan or tray, a transparent dome adapted to rest thereon, fluid inlet and outlet conduits extending through the bottom of the said pan and adapted to enter the said dome, and an extension for one of the said conduits comprising a tube of larger diameter than the said conduit and in telescoped relation thereto.

2. Photochemical apparatus comprising a shallow pan or tray, a transparent dome adapted to rest thereon, fluid inlet and outlet conduits extending through the bottom of the said pan and adapted to enter the said dome, the said outlet conduit being materially longer than the said inlet conduit, and a light source adapted to project actinic rays into the interior of the said dome and disposed nearer to the said outlet conduit than to the said inlet conduit.

3. Photochemical apparatus comprising a transparent reaction vessel of relatively large diameter as compared with its length, a light source adapted to project actinic rays into the said vessel, fluid inlet and outlet conduits extending into the said vessel, and means for causing the fluid issuing from the said inlet conduit to partially diffuse with the contents of the said vessel before being exposed to rays from the said light source.

4. Photochemical apparatus comprising a transparent reaction vessel, fluid inlet and outlet conduits extending into the said vessel, and a sleeve surrounding the said inlet conduit within the said vessel and provided with a plurality of openings disposed adjacent to the end of the said inlet conduit.

5. Photochemical apparatus comprising a transparent reaction vessel, fluid inlet and outlet conduits extending into the said vessel, the said outlet conduit being materially longer than the said inlet conduit, a light source disposed adjacent to the said vessel and nearer to the said outlet conduit than to the said inlet conduit, and a sleeve surrounding the said inlet conduit within the said vessel and provided with a plurality of openings disposed adjacent to the end of the said inlet conduit.

6. Photochemical apparatus comprising a transparent reaction vessel of relatively large diameter as compared with its length, fluid inlet and outlet conduits extending into the said vessel, a light source disposed adjacent to the said vessel, and an opaque member disposed within the said vessel and adapted to permit the fluid issuing from the said inlet conduit to partially diffuse with the contents of the said vessel before being exposed to rays from the said light source.

In testimony whereof, I have hereunto subscribed my name this 27th day of February, 1917.

WALTER O. SNELLING.